Dec. 22, 1936.  B. S. AIKMAN  2,065,204
COMPRESSOR UNLOADING DEVICE
Filed Jan. 30, 1935  2 Sheets-Sheet 1

INVENTOR
BURTON S. AIKMAN.
BY Wm. M. Cady
ATTORNEY

Dec. 22, 1936.  B. S. AIKMAN  2,065,204
COMPRESSOR UNLOADING DEVICE
Filed Jan. 30, 1935  2 Sheets-Sheet 2

INVENTOR
BURTON S. AIKMAN
BY Wm. M. Cady
ATTORNEY

Patented Dec. 22, 1936

2,065,204

UNITED STATES PATENT OFFICE 2,065,204

COMPRESSOR UNLOADING DEVICE

Burton S. Aikman, Wilkinsburg, Pa., assignor to The Westinghouse Air Brake Company, Wilmerding, Pa., a corporation of Pennsylvania Application January 30, 1935, Serial No. 4,042

21 Claims. (Cl. 230—206)

This invention relates to fluid compressors and particularly to control mechanism for continuously driven compressors and adapted to protect the compressor against trouble in the event of failure of the lubricating system.

In many installations fluid compressors are continuously driven by means of an internal combustion engine or a synchronous motor, or otherwise, and the compressor is provided with means to hold the inlet valve open to unload the compressor when the pressure of the fluid compressed by the compressor exceeds a predetermined value.

Compressors as now constructed frequently are provided with an oil reservoir in the lower portion thereof, and the compressor has a pump driven from any suitable part of the compressor mechanism and supplying lubricant under pressure from this oil reservoir to various parts of the compressor. If for any reason the pressure lubricating system should fail to operate, the compressor would be subjected to serious damage, particularly if it were permitted to operate under load, that is, to compress fluid at a time when it was not properly lubricated. It is desirable, therefore, to provide means to unload the compressor in the event of failure of the lubricating system for any reason.

It is an object of this invention to provide an improved compressor unloading device operable in response to variations in the pressure of the fluid compressed by the compressor and to the pressure of the liquid in the lubricating system.

A further object of the invention is to provide an improved compressor unloading system.

Another object of the invention is to provide a compressor having an inlet valve provided with unloading means to hold the valve in the open position, and having means to control the unloading means to operate it in response to variations in either the pressure of the fluid in the reservoir associated with the compressor or the pressure of the liquid in the lubricating system.

A further object of the invention is to provide a compressor with an inlet valve having unloading means operated by fluid under pressure from the reservoir associated with the compressor and having valve means controlling the supply of fluid under pressure to the unloading means, this valve means being operable in response to variations in the pressure of the fluid in the reservoir or to variations in the pressure of the fluid in the lubricating system.

A further object of the invention is to provide an improved control device for use with a continuously operated compressor to control the volume of air compressed by the compressor and to protect the compressor in the event of failure of the lubricating system.

Other objects of the invention and features of novelty will be apparent from the following description taken in connection with the accompanying drawings, in which Figure 1 is an elevational view of one embodiment of a compressor equipped with the control mechanism provided by my invention;

Figure 1:
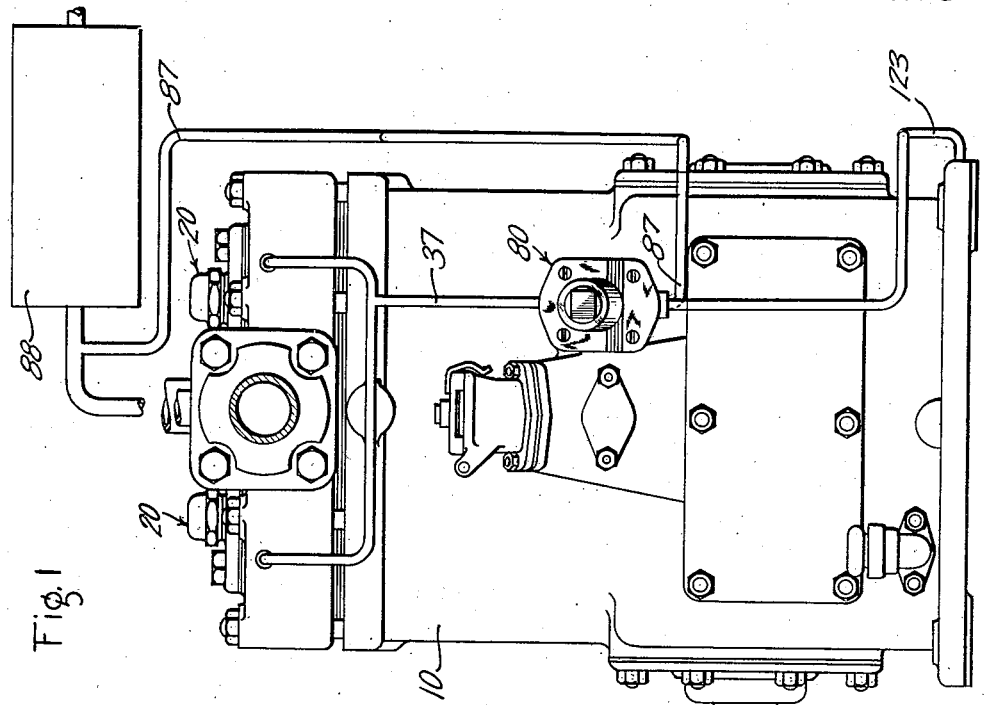
Figure 2:
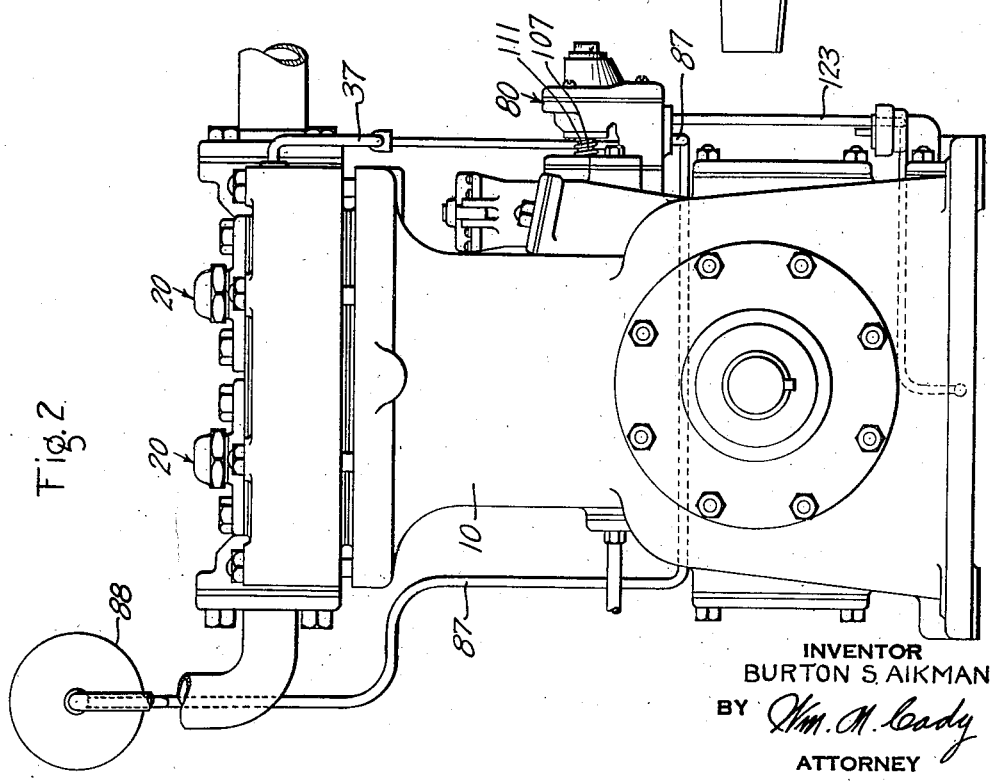
Figure 2 is an end view of the compressor shown in Figure 1.
Figure 3:
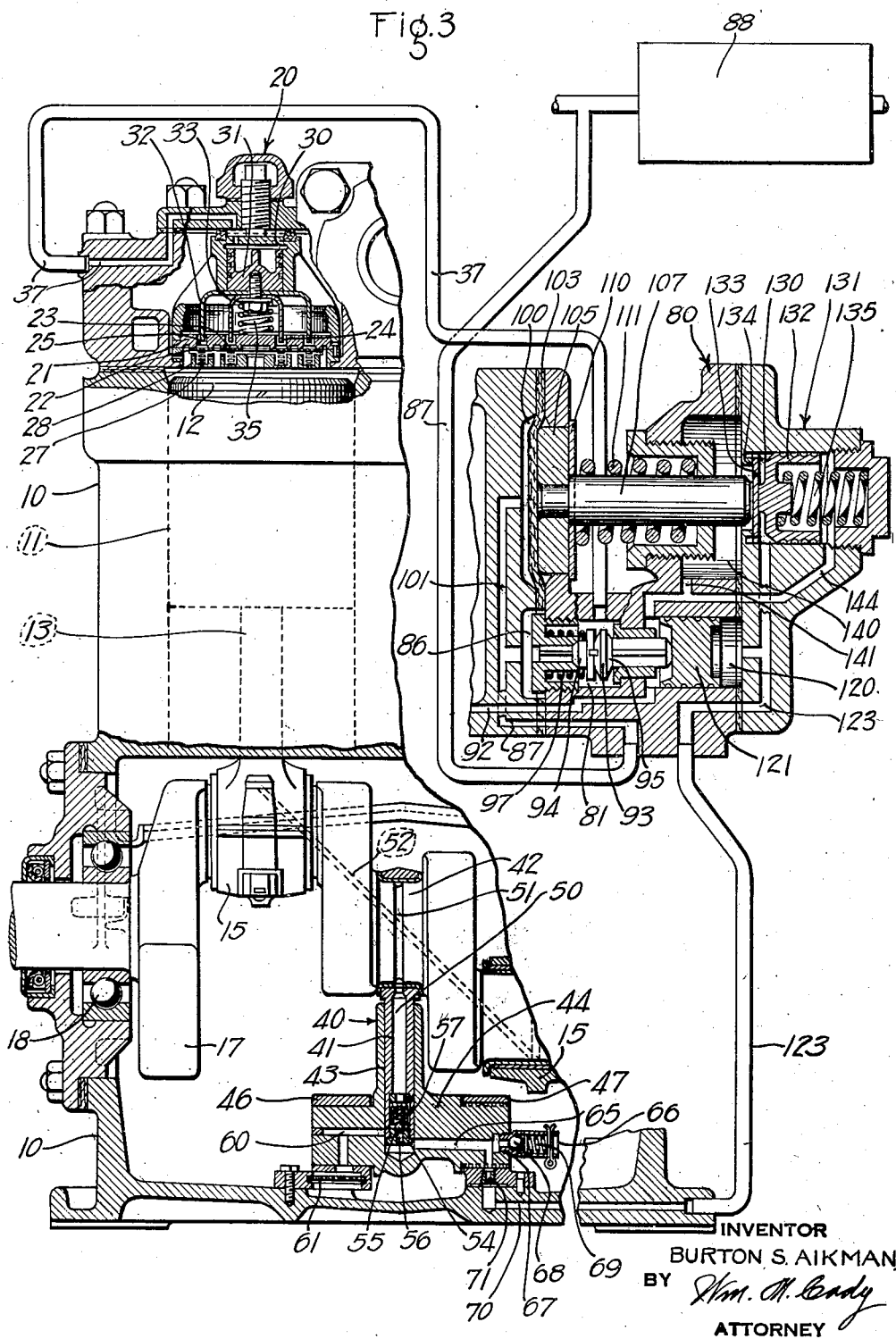
Figure 3 is a diagrammatic view of a compressor equipped with the protective system provided by this invention.

Referring to the drawings, I have illustrated one form of compressor equipped with the protective system provided by my invention, and the compressor therein illustrated comprises a cylinder body indicated generally by the reference character 10 and having a pair of cylinders 11 formed therein in which are reciprocable pistons 12 which are secured on the ends of connecting rods 13 which have their lower ends 15 secured on throws of the crankshaft 17. The crankshaft 17 is supported on anti-friction bearings 18 which are supported by the compressor body 10. Each of the cylinders 11 has an inlet valve assembly 20 associated therewith, and as is best shown in Figure 3 of the drawings, the inlet valve assembly comprises a valve seat 21 extending across a passage leading to the cylinder and having a pair of annular rings 22 and 23 which are adapted to engage the seat 21 and to close the passages 24 and 25 which extend through the valve seat. Springs 27 are provided which engage the rings or discs 22 and 23 to normally urge these members into engagement with the seat 21. The springs 27 are held by a cage 28.

The valve assembly also includes a piston chamber indicated at 30 and having a piston 31 reciprocable therein. The piston 31 has a plurality of fingers 32 and 33 secured to the lower face thereof and extending into the passages 24 and 25 in the valve seat 21, while a spring 35 is interposed between the piston 31 and the valve seat 21 and normally urges the piston upwardly as viewed in Figure 3. Fluid under pressure is supplied to the chamber 30 through the pipe and passage 37, and on an increase in the pressure of the fluid in the chamber 30 the piston 31 is urged downwardly against the spring 35 to press the fingers 32 and 33 against the rings 22 and 23 to unseat these members and unload the compressor.

The compressor is provided with a pressure lubricating system to supply lubricant to different parts of the compressor, and as shown in the drawings, this system comprises a pump indicated generally by the reference character 40, and which is adapted to draw lubricant from the lower or crankcase portion of the cylinder body 10 which serves as an oil reservoir and force it through suitable passages to the connecting rod bearings.

As shown in the drawings the pump 40 comprises a piston 41, which is journaled on an eccentric 42 formed on the crankshaft 17 and is reciprocable in a piston chamber 43 formed in the member 44, which is pivotally mounted on the compressor body 10 by means of brackets 46 and 47. The piston 41 has a passage 50 extending therethrough and registering with an annular groove 51 formed in the eccentric 42 on the crankshaft 17, which in turn communicates with a passage 52 drilled in the crankshaft and leading to the throws of the crankshaft on which the connecting rods 13 are mounted.

The lower end of the passage 50 in the piston 41 is controlled by a check valve device, which, as shown in the drawings, comprises a seat 54 which has a ball valve element 55 engageable therewith to close the passage 56 extending therethrough. The ball valve element 55 is pressed to its seat by the spring 57 so as to normally close the passage through the piston. The chamber 43 has an inlet passage 60 communicating therewith at a point spaced from the end thereof and leading from a chamber formed in the bracket piece 46, this chamber having a screen 61 extending thereacross through which is drawn the oil which flows to the pump.

The chamber 43 has a discharge passage 65 leading therefrom at a point adjacent the end thereof and communicating with a pressure release valve element 66, which, as shown in the drawings, comprises a seat 67 having a ball valve element 68 normally held in engagement therewith by means of a spring 69. When the pressure of the oil pumped by the pump exceeds a predetermined value, the ball valve element 68 is forced away from the seat to permit a portion of the oil to escape, thereby limiting the pressure which can be built up in the lubricating system. The passage 65 also has a passage 70 communicating therewith, the flow of fluid from the passage 65 to the passage 70 being controlled by means of a choke indicated at 71, which serves to limit the rate of flow to the passage 70.

In the operation of the pump, the piston 41 reciprocates in the piston chamber 43 so that the end of the piston 41 at one point in its range of movement is located above the inlet passage 60 leading to the chamber 43 and at another point in its range of movement is located below the passage 60. When the piston moves upwardly lubricant is sucked into the piston chamber 43, and when the piston 41 moves downwardly it cuts off the inlet passage 60 leading to the chamber 43, and the oil in the chamber is placed under pressure so that the ball valve 55 is unseated and a portion of the oil flows through the passage 50 to the annular groove 51, and therefrom through the passage 52 to the connecting rod bearings, while some of the oil flows through the passage 65 to the passage 70 which leads to the control valve. In the event that the pump pumps an excess of oil over that required by the connecting rod bearings or the control valve, the excess oil will be released through the pressure regulating valve 66.

The control valve mechanism provided by my invention is indicated generally by the reference character 80 and its construction is best shown in Figure 3 of the drawings. While the control valve device may be located at any suitable point on the compressor, it is preferred to have the discharge passage leading from the control valve device positioned at a point vertically above the highest point in the compressor which is supplied by lubricant under pressure by the lubricating system so that in the event that there is a reduction in the pressure of the liquid supplied by the lubricating system, or an insufficient quantity of lubricant so supplied, this lubricant will be supplied to the compressor rather than to the control valve element because of the difference in the hydrostatic pressures which must be overcome to force oil to these parts.

As shown in the drawings the control valve device 80 comprises a casing having a valve chamber indicated at 81 and communicating with the unloading valve 20 by means of the pipe 37.

The valve chamber 81 contains a double beat valve element 93 having seat portions 94 and 95, the seat portion 94 controlling communication between the valve chamber 81 and the chamber 86, which communicates through the passage and pipe 87 with the storage reservoir 88 into which the compressor compresses fluid. The seat portion 95 controls communication from the valve chamber 81 to a chamber which is connected to the crankcase chamber, and thus to the atmosphere by way of the passage 92.

The discharge end of the passage 92, in the preferred embodiment of the invention, is located vertically above the highest part of the compressor which is supplied with lubricant under pressure by the lubricating system. A spring 97 is provided which normally urges the valve element 93 to a position in which the passage controlled by the seat portion 94 is open and the passage controlled by the seat portion 95 is closed.

The casing of the control valve device 80 also has a chamber 100 therein which is connected to the passage 87 by way of the passage 101 so that the chamber is supplied with fluid at the pressure of fluid compressed by the compressor. The chamber 100 has a diaphragm 103 extending thereacross and subject to the pressure of the fluid in the chamber 100. A disc 105 engages one side of the diaphragm 103 and has a stem 107 secured thereto, while a plate 110 is positioned against a face of the disc 105 and is slightly larger in diameter than the opening in the housing of the control valve device 80 in which the disc 105 operates. A compression spring 111 is fitted on the stem 107 and normally urges the disc 105 to the left, as viewed in Figure 3, until the plate 110 engages the body of the control valve device 80. The plate 110 serves to limit the amount of deflection of the diaphragm 103 produced by the spring 111.

The control valve device 80 also has a piston chamber 120 formed therein and a piston 121 is provided which is reciprocable in this cylinder. The piston chamber 120 is connected to pipe and passage 123 leading to the passage 70 so that the piston 121 is subject on one side to the pressure created by the operation of the pump 40. The pressure of the fluid acting on the end of the piston 121 urges the piston to the left, as viewed in Figure 3, against the end of the valve element 93, urging it to the left against the pressure of the spring 97 so as to press the valve seat portion 94 into engagement with the seat associated therewith to cut off communication between the chamber 81 and the passage 87, and to open communication between the chamber 81 and the passage 92 leading to the atmosphere.

The passage 123 also communicates with a chamber 130, in which is positioned a valve assembly indicated generally by the reference character 131, and, which as shown, comprises a piston 132, and a valve disc 133 adapted to seat against a seat 134 formed in the housing of the control valve device 80. The piston 132 is normally urged to the left, as viewed in Figure 3, by means of a spring 135 so that the valve disc 133 is in engagement with the seat 134. The valve disc 133 is located axially in alignment with the pin 107, and the end of the pin 107 is closely adjacent the disc 133.

The valve disc 133 controls communication between the chamber 130 and a chamber 140, which communicates with the passage 141 leading to the piston chamber 120 at the left hand end of the piston 121, and therefrom to the passage 92 which leads to the atmosphere through the crankcase chamber of the compressor. A passage 144 also communicates with the passage 141 and with the chamber 130 on the right hand side of the piston 132.

The operation of the control valve device 80 is as follows. Assuming that the pressure of the fluid in the reservoir 88 is below a predetermined value, and assuming that the lubricating system is functioning properly to supply lubricant under pressure to the compressor and to the control valve device, the movable abutment or piston 121 is urged to the left, as viewed in Figure 3, to move the valve element 93 to a position in which the valve 94 is seated so that communication is closed off from chamber 81 to passage 101, which passage is connected to pipe and passage 87 leading to the storage reservoir 88, into which the compressor compresses fluid. At the same time the valve 95 is unseated so that the chamber 81 is open to the atmosphere by way of exhaust passage 92, so that the unloading means 20 associated with the inlet valve of the compressor is in communication with the atmosphere through the pipe 37. In the event of a failure of pressure in the lubricating system due to lack of lubricant or inoperativeness of the pump, or for any other reason, the pressure of the fluid in the chamber 120 will diminish and the spring 97 will force the valve element 93 and the piston 121 to the right, as viewed in Figure 3, thereby closing the passage leading from the chamber 81 to the atmosphere, and opening the passage 101 leading from the source of fluid compressed by the compressor to the chamber 81. Fluid under pressure thereupon flows to the chamber 81, and therefrom to the cylinder 30 associated with the unloading means and urging the piston 31 and the fingers 32 and 33 downwardly to force the valve discs 22 and 23 away from the valve seat 21. This removes all load from the compressor and allows it to run idle so that the loads on the bearings will be at a minimum at a time when the pressure lubricating system is inoperative.

The inlet valve will be held in the open position as long as the pressure in the lubricating system remains at the low value, but as soon as the pressure in the lubricating system is restored to its proper value the pressure in the cylinder 120 will increase and the piston 121 will be moved to the left, as viewed in Figure 3, to shift the valve element 93 to a position to cut off the supply of fluid under pressure to the unloading means and to release the fluid under pressure already in the cylinder of the unloading means. The operation of the control valve device, therefore, is such that no load can be imposed upon the compressor when the lubricating system is not functioning properly.

The control valve device 80 is also operable to control the unloading means in response to an increase in the pressure of the fluid compressed by the compressor above a predetermined value so that the compressor is unloaded at a time when the pressure of the fluid in the reservoir has reached a predetermined value. It will be seen that the control valve device has a chamber 100 which is in communication with the passage 101 and is thus subject to the fluid compressed by the compressor, and, on a predetermined increase in the pressure of the fluid in this chamber, the diaphragm 103 is urged to the right against the pressure of the spring 111. The pin 107 thereupon engages the valve disc 133 to urge this disc to the right away from its seat.

The valve disc 133, however, is urged to its seat by the pressure of the lubricant on the face of the disc and by the pressure of the spring 135 acting on the piston 132, and the pressure of the fluid in the chamber 100 must build up to a value great enough to overcome these forces as well as the force exerted by the spring 111 before the valve disc 133 will be forced away from its seat. As soon as the valve disc 133 is moved out of engagement with the seat 134, the lubricant in the chamber 130 escapes to the chamber 140 and the pressure of the lubricant on the valve disc 133 is reduced, and, as the only force opposing movement of the diaphragm 103 is the spring 111 and the spring 135, the diaphragm 103 will move to the right very rapidly, thereby moving the valve disc 133 to the full open position. This permits lubricant to flow from the passage 123 to the chamber 130 and to the chamber 140 and therefrom to the passage 141 to the piston chamber 120 on the left side of the piston 121 and out through the passage 92 to the crankcase. This quickly releases the pressure on the piston 121 and permits it to be moved very rapidly to the right by the spring 97, which shifts the valve element 93 to the right so that the chamber 81 is cut off from the atmosphere and is in communication with the fluid compressed by the compressor. This causes the unloading means to operate to hold the inlet valve open.

The valve disc 133 is held in the open position until the pressure in the chamber 100, which pressure is the same as that in the reservoir 88, drops to a value low enough that the springs 135 and 111 overcome the force on the diaphragm 103. This pressure will be somewhat lower than that required to unseat the valve disc 133 because, in order to unseat the valve disc, the pressure on the diaphragm 103 must build up to a value great enough to overcome not only the springs 111 and 135, but also the pressure of the lubricant on the valve disc 133, while the diaphragm 103 is urged to a position to permit the valve disc 133 to close only by the springs 135 and 111. As the pressure in the chamber 100 drops, and the disc 133 approaches its seat, the pressure of the lubricant in the chamber 130 will rise due to the decrease in the size of the opening controlled by the disc 133, and the pressure of the lubricant acting on the valve disc 133 will move this disc to its seat very quickly when it once approaches its seat. The flow of fluid from the passage 123, therefore, will be cut off very quickly and the pressure of the fluid in the piston chamber 120 will build up and the piston 121 will be forced to the left to move the valve element 93 to the left to cut off communication between the chamber 81 and the passage 87, and to permit communication between the chamber 81 and the atmosphere through the passage 92. The movement of the valve element 93 will be very rapid due to the rapid increase of the pressure of the fluid in the piston chamber 120, which, as pointed out above, results from the quick seating of the valve disc 133.

Rapid movement of the valve element 93 between the position in which it closes communication between the chamber 81 and the source of fluid under pressure, and the position in which it closes communication between the chamber 81 and the atmosphere, is desirable as this prevents the loss of fluid under pressure through the chamber 81 which would take place if the valve element 93 moved slowly or was held in an intermediate position.

The control valve device provided by my invention also operates to maintain the compressor unloaded in starting until the speed of the compressor reaches a predetermined value.

When the compressor is idle there will be no pressure in the lubricating system and the valve 93 will be shifted to the right by the spring 97 to permit fluid under pressure to flow to the unloading means and effect unloading of the compressor. When the compressor is started, the pressure of the lubricant will increase as the speed of the compressor increases, and when this pressure increases to a predetermined value, the piston 121 will be moved to the left, thereby forcing the valve element 93 to the left so as to cut off communication between the chamber 86 and the pipe 37 and opening communication between the pipe 37 and the atmosphere to release the fluid in the unloading means and effect loading of the compressor. The compressor, therefore, is unloaded in starting until it has reached a predetermined speed.

From the foregoing it will be seen that I have provided control means adapted to control the unloading means associated with an air compressor to operate the unloading means to hold the inlet valve of the compressor open, and that this means is operable in response to a predetermined increase in the pressure of the fluid compressed by the compressor or to a failure of the lubricating system so that the compressor cannot be operated under load when it is not properly lubricated.

It will be seen also that the control device provided by my invention has a lubricant discharge passage associated therewith and communicating with the compressor at a point vertically above the highest point of the compressor which is supplied with lubricant under pressure by the lubricating system so that in the event that there is a deficiency of lubricant, the lubricant supplied by the pump will be furnished to the operating parts of the compressor rather than to the control device.

In addition it will be seen that means is provided to limit the amount of lubricant supplied to the control device so that only a portion of the lubricant pumped by the pump can escape through the control device when this device is held in the open position as a result of an increase in the pressure of the fluid compressed by the compressor above the predetermined value.

While one embodiment of the improved control device provided by my invention has been illustrated and described in detail, it should be understood that the invention is not limited to these details of construction, and that numerous changes and modifications may be made without departing from the scope of the following claims.

Having now described my invention what I claim as new and desire to secure by Letters Patent, is:

1. In a fluid compressor, a lubricating system adapted to supply lubricant under pressure to portions of the compressor, means for unloading the compressor, control means responsive to the pressure of lubricant supplied thereto and operable to control said unloading means, and means responsive to the pressure of fluid compressed by the compressor and controlling the pressure of the lubricant supplied to the control means, said means comprising a valve element controlling a passage leading from said control means, said valve element being subject to the pressure of the lubricant supplied to the control means and being urged thereby to a position to close the passage controlled thereby.

2. In a fluid compressor, a lubricating system adapted to supply lubricant under pressure to portions of the compressor, means for unloading the compressor, and means to control the operation of said unloading means, said means comprising a first movable abutment subject to the pressure of the lubricant in the lubricating system, a second movable abutment subject to the pressure of fluid compressed by the compressor, and a valve element controlling a passage leading from the lubricating system to control the pressure of the lubricant supplied to the first abutment, said valve element being movable by said second abutment to a position to open said passage, the valve element being subject to the pressure of the lubricant in the passage controlled thereby, movement of the valve element to the open position being opposed by the pressure of the lubricant in the passage controlled by the valve element, the means for unloading the compressor being controlled by movement of the first abutment.

3. In a fluid compressor, a lubricating system adapted to supply lubricant under pressure to portions of the compressor, means for unloading the compressor, fluid pressure responsive means to control said unloading means, and a control valve device adapted to control the supply of fluid under pressure to said fluid pressure responsive means, the control valve device comprising a valve element controlling the supply of fluid under pressure to the fluid pressure responsive means, a first movable abutment subject to the pressure of the lubricant in the lubricating system and controlling said valve element, and a second movable abutment subject to the pressure of the fluid compressed by the compressor and controlling the pressure of the fluid supplied to the first abutment.

4. In a fluid compressor, a lubricating system adapted to supply lubricant under pressure to portions of the compressor, means for unloading the compressor, means responsive to fluid pressure and controlling said unloading means, a valve controlling the supply of fluid under pressure to said fluid pressure responsive means, said valve comprising a valve element having biasing means associated therewith and normally urging said valve element to the open position, a movable abutment subject to the pressure of the lubricant in said lubricating system and operable in response to pressure above a predetermined value to urge said valve element to the closed position, and means responsive to the pressure of the fluid compressed by the compressor and controlling the pressure of the lubricant operating on said abutment.

5. In a fluid compressor, a lubricating system adapted to supply fluid under pressure to portions of the compressor, means for unloading the compressor, means responsive to fluid pressure and controlling said unloading means, and a control valve device controlling the supply of fluid under pressure to said fluid pressure responsive means, said control valve device having a chamber therein communicating with said fluid pressure responsive means, a first passage communicating with said chamber and with a supply of fluid under pressure, a second passage communicating with said chamber and with the atmosphere, valve means controlling each of said passages, a movable abutment subject to the pressure of the lubricant in the lubricating system and operable in response to pressures above a predetermined value to move said valve means to a position to close one of said passages and to open the other of said passages, and means responsive to the pressure of fluid compressed by the compressor and controlling the pressure of the lubricant supplied to the said abutment.

6. In a fluid compressor, a lubricating system adapted to supply fluid under pressure to portions of the compressor, means for unloading the compressor, means responsive to fluid pressure and controlling said unloading means, and a control valve device controlling the supply of fluid under pressure to said fluid pressure responsive means, said control valve device comprising a pair of movable abutments, one of said abutments being subject to the pressure of lubricant in the lubricating system, the second abutment being subject to the pressure of fluid compressed by the compressor, valve means controlling the supply of fluid to the unloading means, said valve means being controlled by said first abutment, and means controlled by the second abutment and controlling the pressure of lubricant supplied to the first abutment.

7. In a fluid compressor, a lubricating system adapted to supply fluid under pressure to portions of the compressor, means for unloading the compressor, means responsive to fluid pressure and controlling said unloading means, and a control valve device controlling the supply of fluid under pressure to said fluid pressure responsive means, the control valve device comprising a chamber communicating with the fluid pressure responsive means, a first passage communicating with said chamber and with fluid compressed by the compressor, a second passage communicating with said chamber and with the atmosphere, each of said passages having valve means associated therewith, said valve means comprising a valve element having biasing means associated therewith and operable to urge said valve element to a position to open the first passage and close the second passage, a first movable abutment subject to the pressure of fluid in the lubricating system and operable responsive to pressures above a predetermined value to move said valve element to a position to close said first passage and open said second passage, and a second movable abutment subject to the pressure of fluid compressed by the compressor and controlling the pressure of the lubricant supplied to the first abutment.

8. In a fluid compressor, a lubricating system adapted to supply lubricant under pressure to portions of the compressor, means for unloading the compressor, means responsive to fluid pressure and controlling said unloading means, and a valve device controlling the supply of fluid under pressure to said fluid pressure responsive means, said valve device comprising a valve element having biasing means associated therewith and normally urging said valve element to the open position, a movable abutment subject to the pressure of the lubricant in said lubricating system and operable in response to pressure above a predetermined value to urge said valve element to the closed position, and means responsive to the pressure of the fluid compressed by the compressor and controlling the pressure of the lubricant supplied to said abutment, said means comprising a valve element controlling a discharge passage associated with the lubricating system, said valve element being normally urged by the pressure of the lubricant in the lubricating system to a position to close said passage.

9. In a fluid compressor, a lubricating system adapted to supply lubricant under pressure to portions of the compressor, means for unloading the compressor, means responsive to fluid pressure and controlling said unloading means, and a valve device controlling the supply of fluid under pressure to said fluid pressure responsive means, said valve device comprising a valve element having biasing means associated therewith and normally urging said valve element to the open position, a movable abutment subject to the pressure of the lubricant in said lubricating system and operable in response to pressure above a predetermined value to urge said valve element to the closed position, and means responsive to the pressure of the fluid compressed by the compressor and controlling the pressure of the lubricant supplied to said abutment, said means comprising a discharge passage leading from a portion of said lubricating system and a valve element controlling said passage, the discharge end of said passage being located vertically above the portions of the compressor supplied by lubricant under pressure from said lubricating system.

10. In a fluid compressor, a lubricating system adapted to supply lubricant under pressure to portions of the compressor, means for unloading the compressor, means responsive to fluid pressure and controlling said unloading means, and a control valve device controlling the supply of fluid under pressure to said fluid pressure responsive means, said control valve device comprising a valve element having biasing means associated therewith and normally urging said element to the open position, a movable abutment subject to the pressure of the lubricant in said lubricating system, and operable in response to pressure above a predetermined value to urge said valve element to the closed position, means responsive to the pressure of the fluid compressed by the compressor and controlling the pressure of the lubricant supplied to said abutment, and means to limit the rate of flow of lubricant from the lubricating system to said control valve.

11. In combination, a fluid compressor, a lubricating system adapted to supply lubricant under pressure to the compressor, means for unloading the compressor, control means operable by the pressure of lubricant supplied thereto for operating said unloading means, means to limit the rate of flow of lubricant from the lubricating system to said control means and means responsive to the pressure of fluid compressed by the compressor for controlling the pressure of the lubricant applied to said control means.

12. In combination, a fluid compressor, a lubricating system adapted to supply lubricant under pressure to the compressor, means for unloading the compressor, control means operable by the pressure of the lubricant supplied thereto for operating said unloading means, valve means for controlling the pressure of the lubricant supplied to the control means, said valve means being operative upon a predetermined increase in the pressure of the fluid compressed to open the passage controlled thereby and reduce the pressure of the lubricant supplied to the control means, and means for preventing the movement of the said valve means to close said communication until the pressure of the fluid compressed has been reduced substantially below the pressure at which the valve means is moved to the open position.

13. In combination, a fluid compressor, a lubricating system adapted to supply lubricant under pressure to the compressor, means for unloading the compressor, control means operable by the pressure of the lubricant supplied thereto for operating said unloading means, means to limit the rate of flow of lubricant to said control means, valve means for controlling the pressure of the lubricant supplied to the control means, said valve means being operated upon a predetermined increase in the pressure of the fluid compressed to open the passage controlled thereby and reduce the pressure of the lubricant supplied to the control means, and means for preventing the movement of the said valve means to close said passage until the pressure of the fluid compressed has been reduced substantially below the pressure at which the valve means is moved to the open position.

14. In combination, a fluid compressor, a lubricating system adapted to supply lubricant under pressure to the compressor, means for unloading the compressor, control means operable by the pressure of the lubricant supplied thereto for operating said unloading means, and valve means responsive to the pressure of the fluid compressed by the compressor and controlling a passage having a discharge end located vertically above the portions of the compressor supplied with lubricant by the lubricating system and through which fluid supplied to the control means is discharged whereby the pressure of the fluid supplied to the control means may be controlled.

15. In combination, a fluid compressor, a lubricating system adapted to supply lubricant under pressure to the compressor, means for unloading the compressor, control means operable by the pressure of the lubricant supplied thereto for operating said unloading means, means to limit the rate of flow of lubricant to the control means, and valve means responsive to the pressure of the fluid compressed by the compressor and controlling a passage having a discharge end located vertically above the portions of the compressor supplied with lubricant by the lubricating system and through which fluid supplied to the control means is discharged whereby the pressure of the fluid supplied to the control means may be controlled.

16. In combination, a fluid compressor, a lubricating system adapted to supply lubricant under pressure to said compressor, means for unloading the compressor, means subject to and operated on a predetermined increase in the pressure of the fluid in a chamber to condition the unloading means to load the compressor, means for supplying lubricant from the compressor lubricating system to said chamber at a given rate, and means subject to the opposing pressures of the fluid compressed by the compressor and of the fluid in said chamber and controlling a communication through which fluid may be released from said chamber at a rate more rapid than said given rate.

17. In combination, a fluid compressor, a lubricating system adapted to supply lubricant under pressure to said compressor, means for unloading the compressor, means subject to and operated on a predetermined increase in the pressure of the fluid in a chamber to condition the unloading means to load the compressor, means for supplying lubricant from the compressor lubricating system to said chamber at a given rate, a valve controlling a passage through which fluid may be released from said chamber at a rate more rapid than said given rate, a member subject to the opposing forces of a spring and of the pressure of the fluid compressed by the compressor for moving said valve to a position to open said passage, and means subject to the pressure of the fluid in said chamber and opposing operation of said member to move the valve to the position to open said passage.

18. In combination, a fluid compressor, a lubricating system adapted to supply lubricant under pressure to said compressor, unloading means operated on an increase in the pressure of the fluid supplied thereto to unload the compressor, valve means controlling the supply of fluid under pressure to and the release of fluid under pressure from said unloading means, biasing means yieldingly urging the valve means to a position to supply fluid to said unloading means, movable abutment means subject to and operated on a predetermined increase in the pressure of the fluid in a chamber to move the valve means to a position to release fluid under pressure from said unloading means, means for supplying lubricant from the compressor lubricating system to said chamber at a given rate, and means subject to the opposing pressure of the fluid compressed by the compressor and of the fluid in said chamber and controlling a communication through which fluid may be released from said chamber at a rate more rapid than said given rate.

19. In combination, a fluid compressor, means for unloading the compressor, a pump driven in accordance with the speed of the compressor, means subject to and operated on a predetermined increase in the pressure of the fluid in a chamber to condition the unloading means to load the compressor, means for supplying to said chamber at a given rate fluid pumped by said pump, and means subject to the opposing pressures of the fluid in said chamber and of the fluid compressed by the compressor and controlling a communication through which fluid may be released from said chamber.

20. In combination, a fluid compressor, means for unloading the compressor, a liquid circulating system operated in accordance with the speed of the compressor, means subject to and operated on a predetermined increase in the pressure of the fluid in a chamber to condition the unloading means to load the compressor, means for supplying liquid from said liquid circulating system to said chamber at a given rate, and means subject to the opposing pressures of the fluid compressed by the compressor and of the fluid in said chamber and controlling a communication through which fluid may be released from said chamber at a rate more rapid than said given rate.

21. In combination, a fluid compressor, a liquid circulating system operated in accordance with the speed of the compressor, unloading means operated on an increase in the pressure of the fluid supplied thereto to unload the compressor, valve means controlling the supply of fluid under pressure to and the release of fluid under pressure from said unloading means, biasing means yieldingly urging the valve means to a position to supply fluid under pressure to the unloading means, means subject to and operated on a predetermined increase in the pressure of the fluid in a chamber to move the valve means to a position to release fluid under pressure from said unloading means, means for supplying liquid from said liquid circulating system to said chamber at a given rate, and means subject to the opposing pressures of the fluid in said chamber and of the fluid compressed by the compressor and controlling a communication through which fluid may be released from said chamber at a rate more rapid than said given rate.

BURTON S. AIKMAN.

CERTIFICATE OF CORRECTION.

Patent No. 2,065,204. December 22, 1936.

BURTON S. AIKMAN.

It is hereby certified that error appears in the printed specification of the above numbered patent requiring correction as follows: Page 5, second column, line 69, claim 11, for the word "applied" read supplied; and that the said Letters Patent should be read with this correction therein that the same may conform to the record of the case in the Patent Office.

Signed and sealed this 6th day of April, A. D. 1937.

(Seal)

Henry Van Arsdale
Acting Commissioner of Patents.